Nov. 4, 1924.                    S. W. HUFF ET AL                    1,514,085
                                  HEATER CONTROL
                                 Filed June 11, 1921
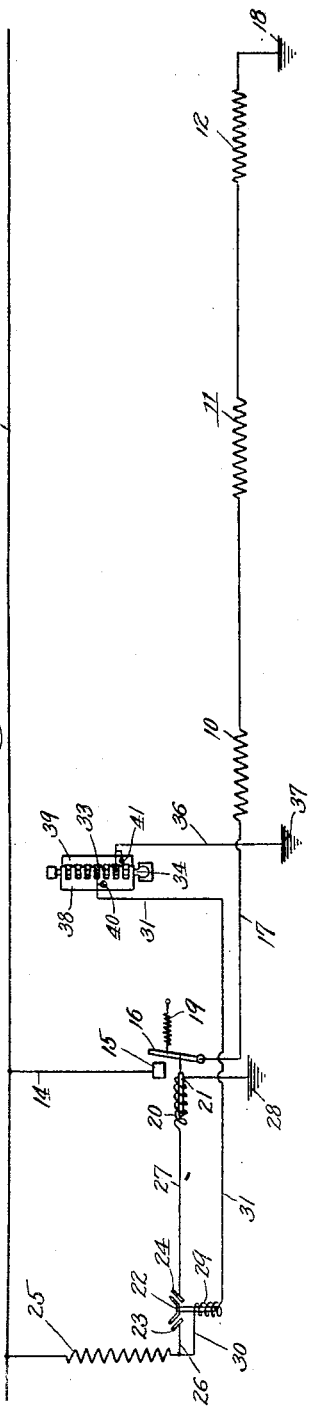
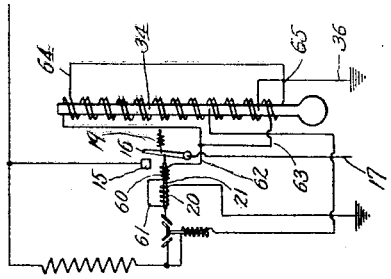
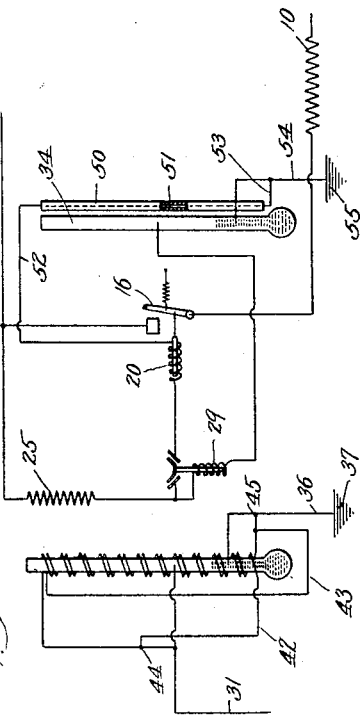
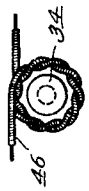
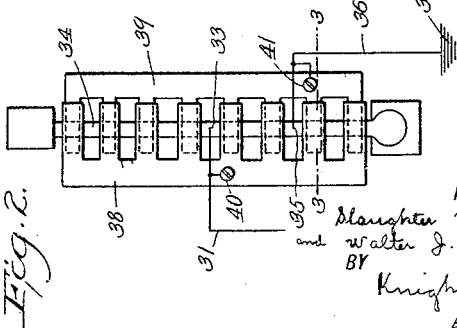
WITNESSES
INVENTORS
Slaughter W. Huff
and Walter J. Turan
BY
ATTORNEY Patented Nov. 4, 1924.

1,514,085

UNITED STATES PATENT OFFICE.

SLAUGHTER W. HUFF AND WALTER J. QUINN, OF NEW YORK, N. Y.

HEATER CONTROL.

Application filed June 11, 1921. Serial No. 476,809.

*To all whom it may concern:*

Be it known that we, SLAUGHTER W. HUFF and WALTER J. QUINN, citizens of the United States, and residents of the borough of Manhattan, city, county, and State of New York, and the borough of Bronx, city of New York, county of Bronx, and State of New York, respectively, have invented certain new and useful Improvements in Heater Control, of which the following is a specification.

Our invention relates in general to electric, steam, hot water, hot air and other heaters, in which the admission of the heating medium to the radiators is to be automatically controlled. Such systems may be employed, for example, in street railway cars, elevated railways, subways and steam or electric railways in general. As ordinarily employed, the system comprises heating elements to which the supply of heating medium from the source is automatically controlled by a relay and controlling means, the relay being in turn under the control of a thermostat, usually in the form of a thermometer provided with contacts closed by the mercury column or other liquid column to discontinue the heating medium when the temperature exceeds the desired maximum but left open at subnormal temperatures so as to continue the heating medium. The means, through which the heating medium is delivered, are in the form of pipes or tubes for example when steam, water or gas is employed as the heating medium, and electrical conductor of ordinary form when electric current is the heating medium. The controlling means herein referred to may be in the form of an electric switch, when electric current is employed. For clearness, we shall refer in detail to an embodiment of the invention as applied to electric heaters.

In systems of this kind, the breaking of the thermometer or thermostat obviously discontinues the relay current so that the heating current remains "on," even though the temperature of the air may go above the desired normal. It is sometimes the case that the thermometer is intentionally broken by the motorman or someone desiring to prevent the discontinuance of the heating current, thus resulting in waste of energy with consequent unnecessary expense. The importance of this feature will be apparent when it is borne in mind that the consumption of current in the heating of cars in cold weather represents a considerable percentage of the total current required for the operation of the railway system.

A primary object of our invention is to provide a system in which the accidental or intentional destruction of the thermometer will automatically result in discontinuing the supply of heating medium to the heaters. The car becoming cold as a consequence is then "turned in" so that the damage becomes known to the operating company and can be promptly remedied. It is, of course, obvious that habitual destruction of the thermometer on the part of some particular employee would soon be apparent.

In accomplishing the objects of our invention, we may employ any suitable form of element or apparatus by which the heating medium supplied to the heaters is automatically discontinued when the thermostat is broken, as we consider it broadly new to provide means for the accomplishment of this result. This special element or apparatus may, for example, control the operation through the relay coil or the operation of the connecting and disconnecting apparatus. Several embodiments of the invention as applied to electric heating are shown in the accompanying drawing for purposes of illustration but it is to be understood that those skilled in the art will be able to produce the same or equivalent results with other specific forms of elements or apparatus within the broad scope of our invention. Referring to said drawing, Figure 1 illustrates diagrammatically the heating system and its connections, with one form of device applied to the thermometer for opening the relay switch upon breaking of the thermometer.

Figure 2 is a detail elevation showing the connections established by the auxiliary device shown on the thermometer in Figure 1.

Figure 3 is a cross section of the same.

Figure 4 is a modified form of auxiliary connecting device applied to the thermometer, the parts being shown in elevation.

Figure 5 is a diagram in elevation showing a further modification of the auxiliary device which operates in this instance to break the circuit through the heater connecting switch.

Figure 6 is a similar view of an auxiliary device applied to the thermometer for energizing a counter coil applied to the heater circuit closing switch coil, and Figure 7 is a cross section showing a construction which may be employed in connection with the auxiliary devices shown in Figures 4 and 6.

Referring in detail to Figure 1, 10, 11 and 12 indicate diagrammatically three heaters through which current may be permitted to flow from source 13 through conductor 14, contact 15, switch arm 16 and conductor 17 to ground, as indicated at 18. The contact 15 and switch arm 16 constitute the heater connecting switch. The arm 16 tends to remain open under the influence of spring 19, but may be closed when its solenoid coil 20 is energized to attract solenoid armature 21.

The supply of current to solenoid coil 20 is controlled by a gravity contact 22 which tends to rest by gravity upon contacts 23, 24 whereby the circuit is closed from the source 13 through resistance 25, conductor 26, contacts 23, 22, 24, conductor 27, solenoid coil 20 and to ground, as indicated at 28. With this circuit connected, switch arm 16 is held connected with the contact 15 to maintain the supply of current through the heaters 10, 11, 12.

The gravity contact 22 may be held disconnected from contacts 23, 24 by a solenoid 29 connected in shunting relation with the circuit of conductor 26 by means of a conductor 30 and conductor 31 leading to a terminal point 33 (see Figure 2) within the mercury chamber of the thermometer 34. This terminal is normally disconnected from a second terminal 35 within the mercury space of the thermometer, but upon these two terminals being bridged by the mercury column the circuit is completed through conductor 36 to ground, as indicated at 37. In this way, the heaters are disconnected when the temperature reaches the desired maximum, as the solenoid 29 is then energized to raise the gravity contact 22 off the contacts 23, 24, thus deenergizing solenoid 20 and permitting the spring 19 to withdraw switch arm 16 from the contact 15.

The circuits and elements thus far described will be regarded as typical of those in ordinary use today.

In order to confer upon the system the property of automatically disconnecting all the heaters upon damage occurring to the thermometer, our invention involves the application of an auxiliary device to the thermometer or thermostat whereby the ordinary circuits are controlled or their currents modified to prevent the supply of current to the heaters.

Figures 1, 2 and 3 show, for this purpose, a pair of normally disconnected or insulated comb-like members of conducting material 38, 39, one of these members being connected as at 40 with the conductor 31 and the other being connected as at 41 with the conductor 36, leading to and from the thermometer. These comb-like conducting members are constructed of any suitable metal or alloy having a low degree of elasticity and of soft and pliable nature. With this construction, an impact applied to damage the thermometer will, at the same time, bend one or more of the soft finger pieces of the outer comb into contact with the corresponding finger or fingers of the inner comb and the circuit through solenoid 29 is established, thus automatically cutting out the solenoid 20 and permitting the spring 19 to hold the switch arm 16 out of engagement with the contact 15.

In Figure 4, the disconnected conductors forming the circuit in parallel to the mercury column are represented as in the form of two closed coils 42 and 43, which are both wound around the thermometer tube but insulated from each other. Coil 42 is, for example, connected to the conductor 31 at the point 44, whereas coil 43 may be connected with the conductor 36 at the point 45. The wires of these coils, especially where they surround the mercury tube, are for example covered with insulating material 46, as shown in Figure 7, this insulating material being of a fragile nature so as to be broken away upon receiving an impact such as would break the thermometer, and thus permit the wire of one coil to be placed in contact with the wire of the other to establish a closed circuit through them to ground.

From the above description, it will be seen that the auxiliary device in effect is a conductor in parallel to the mercury column but normally open, and that upon occurrence of the impact, the parallel auxiliary circuit is closed so that the condition of the system then corresponds to that which obtains normally when the temperature is at the desired maximum. This relation of the auxiliary device to the thermometer or thermostat may, of course, be applied directly, as we have shown it or inversely or indirectly through arrangements such as will be described in connection with Figure 5. In Figure 5, the auxiliary device 50 is, for example, in the form of a fragile tube of glass or other suitable material containing a liquid conductor such as mercury column 51 or other easily separable conducting material and the circuit of solenoid 20 for closing the switch arm 16 is made through conductors 52, 51 and 53, 54 to ground, as indicated at 55. The close proximity of the auxiliary device 50 to the thermometer 34 subjects it to damage simultaneously with the thermometer so that upon breaking of the thermometer, the circuit through solenoid 20 is disconnected by the breaking of the auxiliary device 50 and thus the heaters cannot receive current.

In Figure 6, the construction of the auxiliary device may be similar for example to that shown in Figures 4 and 7 but the circuit connections are here modified to gain the result in a different way. The solenoid coil 20 which closes the switch arm 16 for supplying current to the heaters may be connected substantially as already described with reference to Figure 1. A neutralizing or counter coil 60 is, however, placed in opposition to the coil 20 on the armature 21, this neutralizing coil 60 being so wound and connected as to have an opposing magnetic flux sufficient to neutralize the effect of the coil 20. We have shown this neutralizing coil 60 as being connected in parallel with coil 20 by means of conductor 61, the current passing from coil 60 through conductor 62 into a closed coil or loop conductor 63 extending around thermometer tube 34 in close proximity to but insulated from a similar closed loop or coil 64 which is connected to conductor 36 at the point 65. The construction of coils 63 and 64 may follow that shown in detail in Figure 7 and described with reference thereto. Upon damage to the thermometer 34, the contact between coils 63 and 64 is automatically established so that the neutralizing coil 60 is energized and switch arm 16 remains out of contact with the contact 15 under the influence of spring 19 as already described, thus preventing the supply of current through conductor 17 to the heaters.

We claim:—

1. A thermostatically controlled heating system comprising in combination, heater elements, means for furnishing a heating medium thereto, a controlling means for said heating medium, a thermostat, and an auxiliary protective shield associated with said thermostat said shield connected with an electric circuit for automatically preventing the supply of the heating medium to the heater elements upon damage to the thermostat.

2. In a thermostatically controlled heating system, a combination of the heater elements, means for supplying a heating medium thereto, a controlling means for said medium, a thermostat governing said controlling means, and an auxiliary protective shield located adjacent to the thermostat and adapted to be injured simultaneously with an injury directed to the thermostat, and an auxiliary electric circuit connected with said shield to automatically prevent the supply of heating medium to the heating elements when such injury occurs.

3. A thermostatically controlled heating system comprising in combination, heater elements, a source of heating medium, means for conveying heating medium to said heater elements, a thermostat controlling means governed by said thermostat for controlling the supply of heating medium, a protecting shield on said thermostat and an auxiliary electric circuit connected with said shield for keeping the supply of heating medium turned off independent of the temperature when said shield is subjected to impact.

4. A thermostatically controlled heating system comprising in combination a contact making thermometer, having a pair of electrical contacts, a shield of conducting material applied to said thermometer, said shield being made in two closely adjacent parts insulated from each other, one of said parts being electrically connected to one of said contacts and the other part being electrically connected to the other contact.

5. A thermostatically controlled electric heating system comprising in combination heater elements, a source of electric power, a circuit connecting said source and said heater elements, a switch in said heating circuit, a thermostat not traversed by the heating current, but carrying an auxiliary current at temperatures above the normal limit to maintain said switch in the heating circuit open and an auxiliary circuit associated with the thermostat to come into operation to carry said auxiliary current upon damage to the thermostat.

6. A heating system comprising heater elements, means for supplying a heating medium thereto, controlling means for controlling the supply of heating medium to the heater elements, a thermostat, and an auxiliary protective device associated with the thermostat and containing a fragile conductor essential to the supply of heating medium to the heaters whereby breaking of the thermostat simultaneously breaks the fragile conductor and prevents the supply of heating medium to the heaters.

7. A heating system comprising in combination heater elements, supply and control conduits therefor, said control conduit comprising an electric circuit including a thermostat, and an auxiliary circuit, connected in parallel with said thermostat, having a pair of normally open contacts in shielding relation to the thermostat so as to be automatically moved into contact by an impact received by the thermostat.

SLAUGHTER W. HUFF.
WALTER J. QUINN.